United States Patent
Altekruse

(10) Patent No.: US 9,818,529 B2
(45) Date of Patent: Nov. 14, 2017

(54) WELDING TYPE POWER SUPPLY WITH WELD TRANSFORMER

(71) Applicant: Illinois Tool Works Inc., Glenview, IL (US)

(72) Inventor: Kenneth C. Altekruse, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 321 days.

(21) Appl. No.: 14/535,654

(22) Filed: Nov. 7, 2014

(65) Prior Publication Data

US 2016/0133378 A1    May 12, 2016

(51) Int. Cl.
| | |
|---|---|
| H01F 27/30 | (2006.01) |
| H01F 27/29 | (2006.01) |
| H01F 27/08 | (2006.01) |
| H01F 27/32 | (2006.01) |
| H01F 27/28 | (2006.01) |
| H01F 38/08 | (2006.01) |
| B23K 37/00 | (2006.01) |
| H05B 6/04 | (2006.01) |

(52) U.S. Cl.
CPC .......... *H01F 27/325* (2013.01); *B23K 37/00* (2013.01); *H01F 27/085* (2013.01); *H01F 27/2823* (2013.01); *H01F 27/2876* (2013.01); *H01F 38/085* (2013.01); *H05B 6/04* (2013.01)

(58) Field of Classification Search
CPC .................................................... H01F 27/085
USPC ........................................................ 336/198
See application file for complete search history.

(56) References Cited

U.S. PATENT DOCUMENTS

| | | | |
|---|---|---|---|
| 6,344,786 B1 * | 2/2002 | Chin | ........................ H01F 27/06 336/192 |
| 6,864,777 B2 | 3/2005 | Sigl | |
| 2002/0175798 A1 * | 11/2002 | Sigl | ........................ H01F 38/085 336/198 |
| 2009/0261934 A1 | 10/2009 | Wolfgram | |
| 2014/0021180 A1 | 1/2014 | Vogel | |

FOREIGN PATENT DOCUMENTS

| | | |
|---|---|---|
| EP | 1434241 A1 | 6/2004 |
| GB | 2089764 A | 6/1982 |
| JP | 2002134334 A | 5/2002 |

OTHER PUBLICATIONS

International Search Report, Jan. 26, 2016, European Patent Office, Rijswijk, Netherlands.

* cited by examiner

*Primary Examiner* — Ronald Hinson
(74) *Attorney, Agent, or Firm* — George R. Corrigan

(57) ABSTRACT

A method and apparatus for providing welding type power supply includes a power circuit and a control circuit. The power circuit receives input power and provides welding type power to a welding output. The power circuit includes a transformer having a primary winding and a secondary winding. The secondary winding is in electrical communication with the welding output. The control circuit is connected to control the power circuit. The transformer includes a bobbin with the primary winding and the secondary winding wound thereon. The bobbin can includes vents to allow air flow into the bobbin. A winding separator can be disposed between the primary and secondary windings.

16 Claims, 3 Drawing Sheets

WELDING TYPE POWER SUPPLY WITH WELD TRANSFORMER

FIELD OF THE INVENTION

The present disclosure relates generally to welding type power supplies having electrical transformers. More specifically, it relates to transformers for use in creating weld power.

BACKGROUND OF THE INVENTION

High frequency transformers operating at high voltages and high currents are commonly used in welding type power supplies. Welding type power supply, as used herein, is a power supply that provides a welding type output. Welding type output, as used herein, is an output suitable for welding, plasma cutting, or induction heating.

Welding type power supplies have a wide variety of topologies. For example, they can include a preregulator to provide a bus, and have an output converter that converts the bus into a desired current and voltage. Examples of pre-regulators include boosts, bucks, rectifiers, etc. Examples of output converters, include inverters, boosts, bucks, choppers, etc. Welding type power supplies can have additional, intermediate stages, and can receive utility power as input power, or include a generator.

One prior art welding power supply transformer for weld power is described in U.S. Pat. No. 6,864,777, hereby incorporated by reference. Some prior art transformers include a central bobbin having a coil winding window disposed about a central opening in the bobbin. The central opening is provided to receive one or more laminated or ferrite magnetic cores. Standard off-the-shelf magnetic cores are available in a wide variety of sizes and shapes, many of which have square or rectangular cross-sections. The coil windings typically also have rectangular or square cross sections wound close to the magnetic cores. This is because it is generally desirable to keep the coil windings close to the magnetic core to maximize the magnetic coupling between the magnetic core and the coil windings.

Control and auxiliary power transformer windings can be purchased, but it is generally costly to purchase windings. Also, each transformer adds weight and cost to the welding type power supply. Thus, it is desirable to have a reduced number of transformers. Windings and transformers tend to be components that need cooling.

Another problem with welding power supply transformers, is providing adequate cooling to the transformer. In particular, the inner windings are hard to cool. Increasing the transformer size can make it easier to cool or require less cooling, but that can add cost, size and weight to a welding-type power supply.

Thus, it is desirable to provide a weld power transformer with an effective way to cool the transformer.

SUMMARY OF THE PRESENT INVENTION

According to a first aspect of the disclosure a welding type power supply includes a power circuit and a control circuit. The power circuit receives input power and provides welding type power to a welding output. The power circuit includes a transformer having a primary winding and a secondary winding. The secondary winding is in electrical communication with the welding output. The control circuit is connected to control the power circuit. The transformer includes a bobbin with the primary winding and the secondary winding wound thereon. The bobbin includes vents to allow air flow into the bobbin.

According to a second aspect of the disclosure a welding type power supply includes a power circuit and a control circuit. The power circuit receives input power and provides welding type power on a welding output. The power circuit includes a transformer that has primary winding and secondary windings. The control circuit is connected to control the power circuit. The transformer includes a bobbin that has the primary and secondary windings wound thereon. A winding separator is disposed between the primary and secondary windings.

The bobbin includes a surface on which a winding is wound, and the air vents are disposed in the surface to allow air flow inside the bobbin in one alternative.

The surface includes at least one rounded portion, and the vents are disposed in the rounded portion, in another alternative.

The bobbin has an elongate shape and the rounded portions are on the ends of the elongate shape in one embodiment.

A winding separator is disposed between the primary and secondary windings in various embodiments.

The winding separator is offset from the bobbin, such that air flows between the winding separator and the bobbin in one embodiment.

The winding separator includes a plurality of flanges that offset the winding separator from the bobbin, in various embodiments.

The winding separator is over the primary winding and under the secondary winding, so that air flows between the secondary winding and the bobbin, between the winding separator and the bobbin, to the primary winding, in another alternative.

The winding separator includes at least one protruding lip that electrically insulates and increases the creepage distance between the primary winding and the secondary winding. in one embodiment.

The plurality of flanges are on the at least one protruding lip in various embodiments.

The winding separator is offset from the bobbin, such that air flows between the winding separator and the bobbin in another alternative.

Other principal features and advantages of will become apparent to those skilled in the art upon review of the following drawings, the detailed description and the appended claims.

Figure 1:
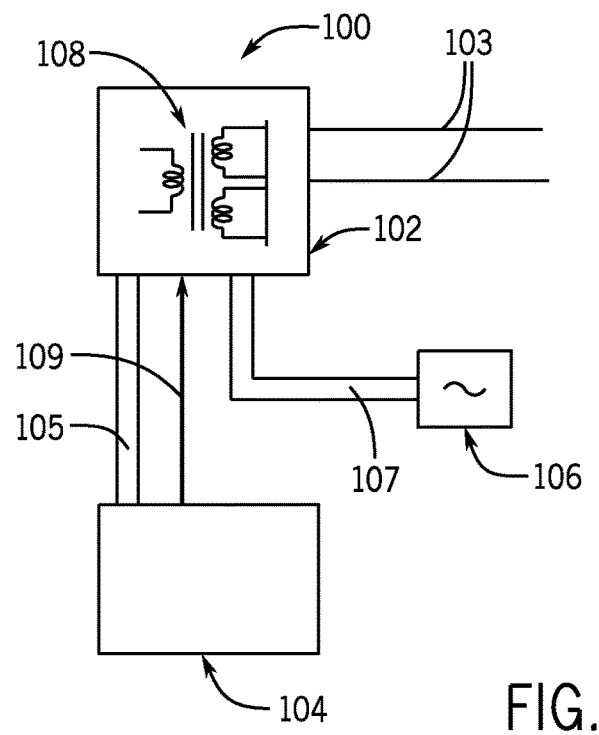
FIG. 1 is block diagram of a welding type power supply.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of

DETAILED DESCRIPTION OF THE PREFERRED EMBODIMENTS

While the present disclosure will be illustrated with reference to a particular welding-type power supply with a particular transformer and windings, it should be understood at the outset that the invention can also be implemented with other welding-type power supplies, transformers and windings.

Generally, in accordance with the invention a welding type power supply 100 includes a power circuit 102 and a control circuit 104, as shown in FIG. 1. Other items, such as a generator, wire feeder, welding gun, robot, etc. can be included. Welding type power supply 100 can also include an auxiliary power output module 106, to which utility power (or other aux power) is provided on output 107. In the preferred embodiment module 106 provides 120 VAC at 60 Hz to the user.

Power circuit 102 receives input power, such as power from a utility or generator, and provides welding type power on a welding output 103. In the preferred embodiment power circuit 102 includes a preregulator, a high voltage split bus, and a stacked inverter output, such as that shown in patent application Ser. No. 13/839,235, published as US-2014-0021180-A1, hereby incorporated by reference. Alternatives provide for using other topologies. Power circuit 102 includes a high frequency transformer 108 which receives power and provides weld power. In the preferred embodiment the input to the primary of transformer 108 is derived from a regulated bus, such as by an inverter. The output of the secondary of weld transformer 108 may be further processed, such as rectified, chopped, etc.

The invention may be easily understood with reference to U.S. Pat. No. 6,864,777, and the invention improves on a transformer such as the ones shown therein by providing for air flow to cool the inner windings and core.

Figure 6:
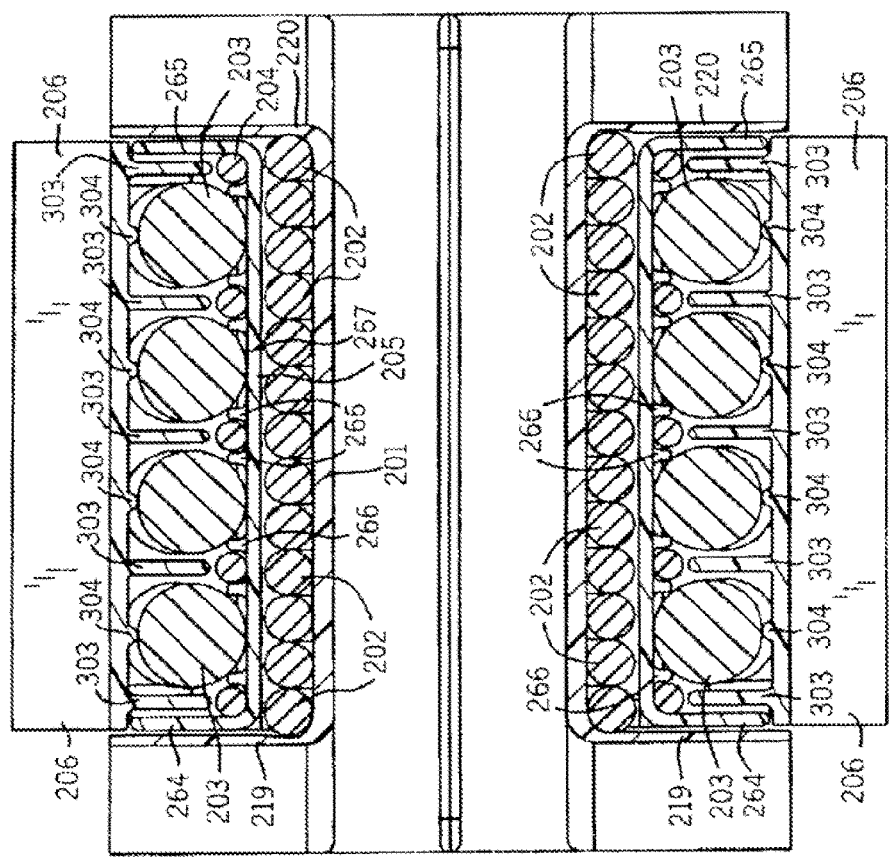
FIG. 6 is a cross sectional view of a prior art transformer.

FIG. 6 shows a cross section of a prior art transformer, which can be used in the present invention, with the changes described herein. The transformer includes a bobbin 201, about which a primary coil 202 is wound. A winding separator 267 is placed over the primary coil. A secondary coil 203 is wound over the winding separator. A boost coil 204 is also shown (and may be omitted in some alternatives). A cover 206 is placed over secondary winding 203.

Figure 2:
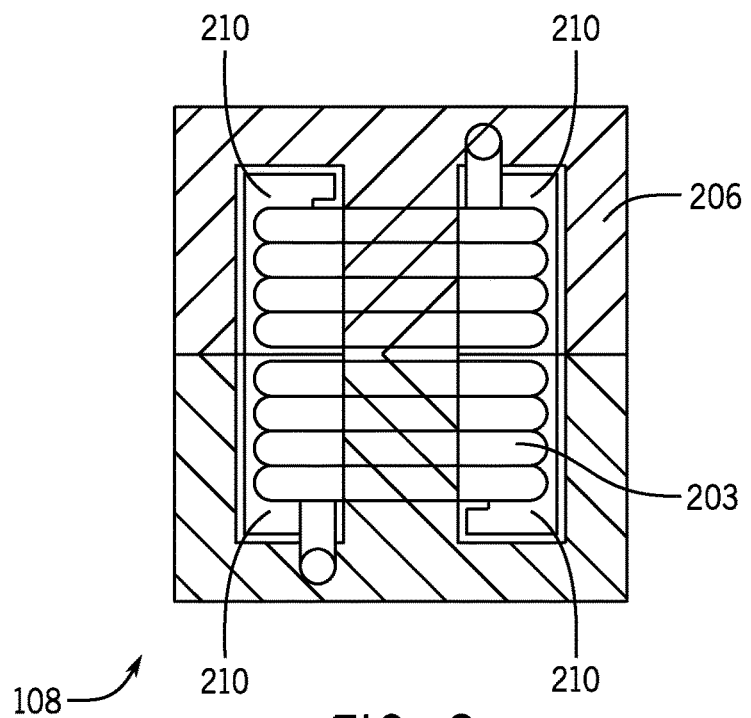
FIG. 2 is a side view of the transformer of FIG. 1.

Turning now to FIGS. 2-5 the unique features of this invention may be seen. FIG. 2 shows transformer 108, with secondary winding 203 and cover 206. Also, air vent channels 210 may be seen, which are not found in the prior art.

Figure 3:
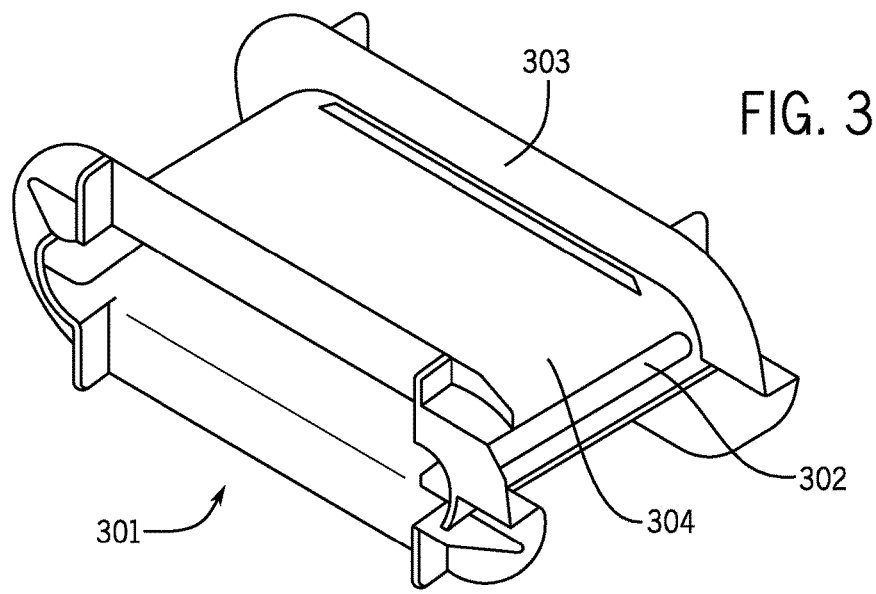
FIG. 3 shows a perspective view of a bobbin 301 used in the transformer of FIG. 2.

FIG. 3 shows a perspective view of a bobbin 301 in accordance with the preferred embodiment. Bobbin 301 replaces bobbin 201 in the prior art. Bobbin 301 has an elongate shape and includes surface 304 about which winding 202 is wound. Winding separator 301 also includes air vents 302 in surface 304, at each rounded end of bobbin 301. These vents allow air to flow into the interior of bobbin 302 and cool the core therein. Alternatives provide for more or fewer air vents, and air vents in different locations.

Figure 4:
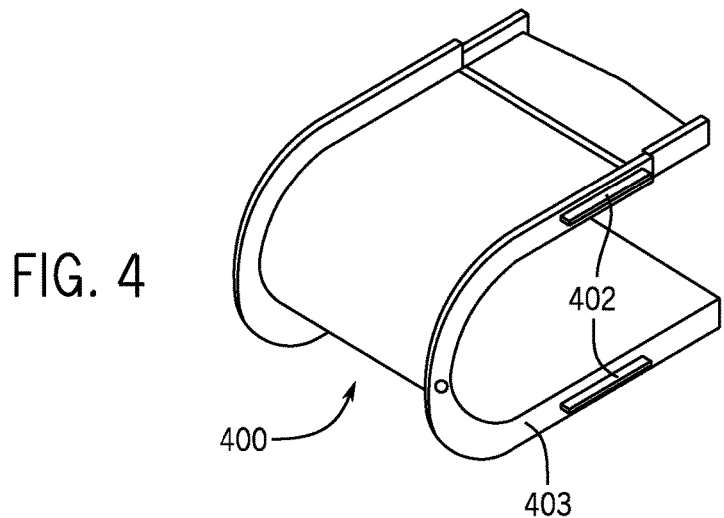
FIG. 4 is a perspective view of a winding separator used in the transformer of FIG. 2.

FIG. 4 shows a winding separator 400 that replaces winding separator 267 of the prior art. Winding separator 400 includes a plurality of flanges 402 that provide an offset between the side wall 403 of winding separator 402 and the side wall 303 of bobbin 301 (FIG. 3). Alternatives provide that the flanges are on bobbin 301, or that there are more or fewer flanges, or they have a different shape and location. Winding separator, as used herein, is a part that is formed or shaped to separate windings, and that provides structure about which a winding may be wound. It does not include tape. Winding separator 400 includes a protruding lip to provide electrical insulation and increase the creepage distance between the primary winding and the secondary winding in one embodiment. A protruding lip on a winding separator, as used herein, is an extension of the separator that extends away from the surface about which a winding is wound.

Figure 5:
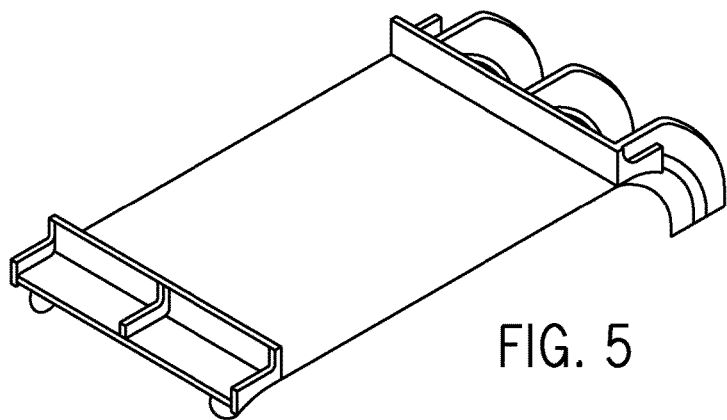
FIG. 5 is a perspective view of a cover used with the transformer of FIG. 2.

FIG. 5 shows a cover that can go over the secondary winding. The cover or bobbin 301 can include flanges to offset the cover, if bobbin 301 extends beyond the cover. Windings 202 and 203 may be those shown in FIG. 6, and if desired boost winding 206 can also be used.

Numerous modifications may be made to the present disclosure which still fall within the intended scope hereof. Thus, it should be apparent that there has been provided a method and apparatus for providing welding type power using a transformer that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A welding type power supply, comprising:
   a power circuit, disposed to receive input power and provide welding type power to a welding output wherein the power circuit includes a transformer having a magnetic core, a primary winding and having a secondary winding in electrical communication with the welding output; and
   a control circuit connected to control the power circuit;
   wherein the transformer includes a bobbin having the primary winding and the secondary winding wound thereon, and wherein the bobbin includes vents that are disposed to create an air flow path from the winding through the bobbin to the interior of the bobbin to allow air flow from outside the bobbin into the bobbin to reach the magnetic core; and
   a winding separator disposed between the primary winding and the secondary winding, wherein the winding separator is offset from the bobbin, to create an air flow path from outside the winding separator through the winding separator to the bobbin such that air flows between the winding separator and the bobbin.

2. The welding type power supply of claim 1, wherein the winding separator includes a plurality of flanges that offset the winding separator from the bobbin.

3. The welding type power supply of claim 1, wherein the bobbin includes a surface on which a winding is wound, and wherein air vents are disposed in the surface to allow air flow inside the bobbin.

4. The welding type power supply of claim 3, wherein the surface includes at least one rounded portion, and wherein the vents are disposed in the rounded portion.

5. The welding type power supply of claim 4, wherein the bobbin has an elongate shape and the at least one rounded portion is the ends of the elongate shape.

6. The welding type power supply of claim 1, wherein the winding separator is disposed over the primary winding and under the secondary winding, such that air flows between the secondary winding and the bobbin, between the winding separator and the bobbin, to the primary winding.

7. The welding type power supply of claim 6, wherein the winding separator includes at least one protruding lip, wherein the protruding lip provides for electrical insulation and increases the creepage distance between the primary winding and the secondary winding.

8. The welding type power supply of claim 7, wherein a plurality of flanges are on the at least one protruding lip.

9. A welding type power supply, comprising:
a power circuit, disposed to receive input power and provide welding type power to a welding output wherein the power circuit includes a transformer having a primary winding and having a secondary winding; and
a control circuit connected to control the power circuit;
wherein the transformer includes a bobbin with having the primary winding and the secondary winding wound thereon, and a winding separator disposed between the primary winding and the secondary winding, wherein the winding separator is offset from the bobbin to create an air flow path from outside the winding separator through the winding separator to the bobbin, such that air flows between the winding separator and the bobbin.

10. The welding type power supply of claim 9, wherein the winding separator includes a plurality of flanges that offset the winding separator from the bobbin.

11. The welding type power supply of claim 10, wherein the winding separator is disposed over the primary winding and under the secondary winding, such that air flows between the secondary winding and the bobbin, between the winding separator and the bobbin, to the primary winding.

12. The welding type power supply of claim 11, wherein the winding separator includes at least one protruding lip, wherein the protruding lip provides for electrical insulation and increases the creepage distance between the primary winding and the secondary winding.

13. The welding type power supply of claim 12 wherein a plurality of flanges that offset the winding separator from the bobbin are on the at least one protruding lip.

14. The welding type power supply of claim 9, wherein the bobbin includes a surface on which a winding is wound, and wherein air vents are disposed in the surface to allow air flow inside the bobbin.

15. The welding type power supply of claim 14, wherein the surface includes at least one rounded portion, and wherein the vents are disposed in the rounded portion.

16. The welding type power supply of claim 15, wherein the bobbin has an elongate shape and the at least one rounded portion is the ends of the elongate shape.

* * * * *